United States Patent [19]

Yoshikawa et al.

[11] 3,905,964

[45] Sept. 16, 1975

[54] 4,4'-DIAMINOSTILBENE-2,2'-DISULFONIC ACID DERIVATIVES AND PROCESSES USING SAME

[75] Inventors: Motohiko Yoshikawa, Omiya; Yoshiaki Shimizu, Kawaguchi; Yoshiharu Tanaka, Tokyo; Kazuo Ishii, Yono, all of Japan

[73] Assignee: Nippon Kayaku Kabushiki Kaisha, Tokyo, Japan

[22] Filed: Jan. 15, 1973

[21] Appl. No.: 323,431

[30] Foreign Application Priority Data

Aug. 4, 1972 Japan................................ 47-78139

[52] U.S. Cl......... 260/240 B; 106/176; 117/33.5 R; 117/33.5 T; 162/162; 252/301.2 W
[51] Int. Cl.²................. C07D 251/14; C09B 23/00
[58] Field of Search ................................. 260/240 B

[56] References Cited
UNITED STATES PATENTS
2,945,762  7/1960  Carroll et al.................... 260/240 B FOREIGN PATENTS OR APPLICATIONS
528,443    7/1956  Canada........................... 260/240 B
1,100,584  3/1961  Germany......................... 260/240 B
1,965,585  7/1971  Germany......................... 260/240 B Primary Examiner—John D. Randolph
Attorney, Agent, or Firm—Lane, Aitken, Dunner & Ziems

[57] ABSTRACT

Novel bistriazinylaminostilbene derivatives of the general formula:

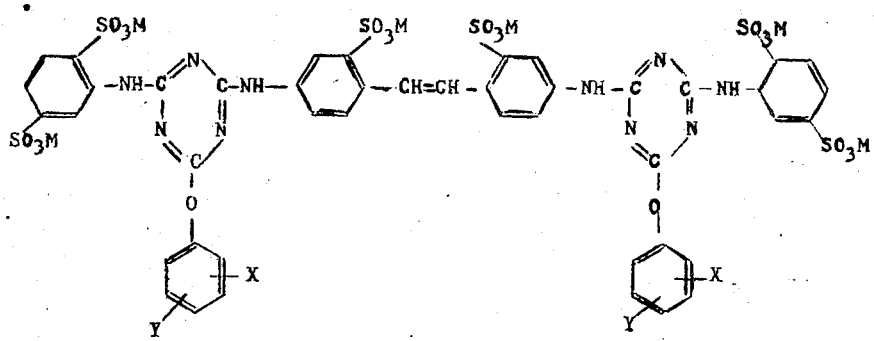

wherein X and Y, which may be the same or different atoms or groups, are chlorine atoms, hydrogen atoms, alkyl groups such as methyl, ethyl, n-butyl, ter.-butyl and n-octyl groups or methoxy groups and M is a cation which is hydrogen, alkali or alkaline earth metal or ammonium cation or an ammonium cation derived from a primary, secondary or tertiary amine. The derivatives are useful as fluorescent brighteners for paper or polyamide fibers and in effecting simultaneous resin finishing and fluorescent brightening of cellulosic fibers.

16 Claims, No Drawings

4,4'-DIAMINOSTILBENE-2,2'-DISULFONIC ACID DERIVATIVES AND PROCESSES USING SAME

DETAILED DESCRIPTION OF THE INVENTION

This invention relates generally to novel bis-triazinylaminostilbene derivatives represented by the following formula (1)

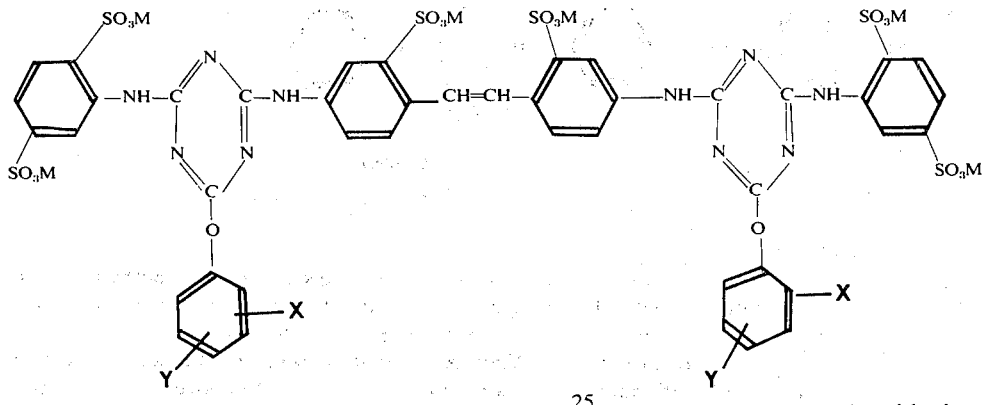

wherein X and Y, which may be the same or different atoms or groups, are chlorine atoms, hydrogen atoms, alkyl groups such as methyl, ethyl, n-butyl, ter.-butyl and n-octyl groups or methoxy groups, and M is hydrogen atom, alkali or alkaline earth metal or ammonium cation or an ammonium cation derived from a primary, secondary or tertiary amine. These derivatives have now been found to be useful for fluorescent brightening of paper or polyamide fibers and for effecting simultaneous resin finishing and fluorescent brightening of cellulosic fibers by the use of a resin finishing bath having said derivatives present therein.

The derivatives represented by the formula (1) may be prepared by condensing about 2 moles of sodium aniline-2,5-disulfonate with about 2 moles of cyanuric chloride at 10°C or below and then condensing the resulting product first with about 1 mole of sodium 4,4'-diaminostilbene-2,2'-disulfonate at 50°C or below and then with about 2 moles of phenol or a substituted derivative thereof at 80° to 100°C. Phenol or phenol derivatives which may be used in the aforementioned preparative process are represented by the following formula

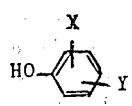

wherein X and Y have the same meanings as defined for the formula (1). Examples of such compounds include the following: phenol, o-chlorophenol, m-chlorophenol, p-chlorophenol, 2,4-dichlorophenol, p-methoxyphenol, o-cresol, p-cresol, m-cresol, 2-methyl-4-chlorophenol, 2,4-xylenol, 2,6-xylenol, 3,4-xylenol, 2,5-xylenol, p-ter.-butylphenol, p-n-butylphenol and p-n-octylphenol.

The compounds of formula (II) thus obtained (preferably alkali metal salts such as sodium and potassium salts, and mono-, di- and trialkanolamine salts), in the form of powder per se or in the form of a liquid solution, are excellent brightening agents for high molecular weight organic materials such as textile materials and fiber and find a wide range of useful applications. In particular, the compounds of formula ( ) are very stable in acid media i.e. do not readily precipitate, and can be used together with alum or resin sized in paper manufacturing processes or with casein-clay coatings on paper. Furthermore, the compounds of the present invention offer the advantage that when used in a resin treatment bath, fluorescent brightening of the fibers can be affected simultaneously with the resin finishing process. They impart excellent brightness and light resistance to nylon treated therewith.

The use of the compounds of the invention is described in greater detail below.

i. Application to paper (size press or pigment coating process)

The compounds of formula (1) are suitable for use in the so called spray, size press or pigment coating process wherein paper, e.g. sized paper, is brightened after being formed into a sheet, for example during or after the step of drying. In the most widely used prior art method of brightening paper, the internal addition process, fluorescent brighteners are added to the paper stock in a beating or mixing chest. Recently, however, the internal addition process has become less frequently used for fluorescent brighteners due to deficiencies with respect to the time required for treating, the efficient use of brighteners and the disposal of waste liquor problem. On the other hand, brightening by surface treatment or surface application has become more frequently used. Most of the fluorescent brighteners which are presently used in the surface treating or surface application processes are brighteners of the type that have been used in the prior art internal addition processes. With the use of such prior art fluorescent brighteners in the surface treating processes, the desired brightness is obtained only with difficulty. Moreover, the material so treated shows fluctuations in brightness. Accordingly, there exists a need in the art for agents with high brightening properties suitable for use in surface treating or surface application processes. It has now been discovered that the compounds of formula (1) possess excellent properties as fluorescent brighteners when used in surface treating or surface application processes. In concentrations where conventional fluorescent brighteners (for example the compound of formula (A) below) show a quenching phenomenon (i.e. yellowing phenomenon brought about by concentration quenching) for example 0.6 percent for a size press process; 2 percent, based on mineral pigment, for a coating process, the compounds of the present invention (formula 1) don't produce such a phenomenon. As a consequence, high brightness is easily obtainable which has not been attained with any prior art fluorescent brighteners (for example the compound of formula (A) shown below).

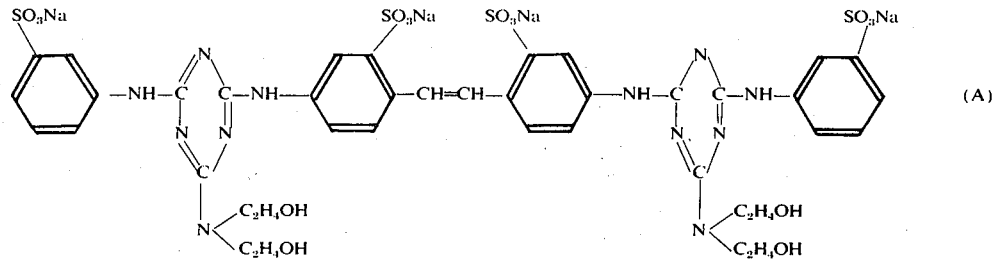

Furthermore, the compounds of the present invention (formula 1) are very compatible with a variety of pigments of mineral origin and with a variety of binders such as polyvinyl alcohol, latex, starch and casein. They also have excellent compatibility with optionally used insolubilizing agents of various types (for example zinc sulfate).

The base paper generally used contains aluminum sulfate and, therefore, the pH in the paper leaf is rather acidic. With conventional fluorescent brighteners, this low pH will gradually affect the brightening composition applied to the surface of the base paper and with the passage of time, the brightness will be gradually lowered.

The compounds of the present invention have outstandingly high acid resistance and thereby avoid this latter-mentioned problem.

When the compounds of the present invention are employed in the standard size press process or pigment coating process, binders or mineral pigments of any type may be used. Examples of suitable binders include casein, oxidized starch, enzymatically modified starch and other starch derivatives, soybean protein, polyvinyl alcohol, latices, acryl resins, glue, carboxymethyl cellulose and the like. Examples of suitable mineral pigments include clays, agalmotolite, calcium carbonate, aluminum hydroxide, titanium oxide, zinc oxide, satin white, calcium silicate, silica and the like.

The compounds of the present invention also exhibit good brightening properties in starch/latex systems which have recently become widely used. Even where inexpensive clay with inadequate whiteness is used instead of expensive pure white clay, adequate brightness can be attained through the use of somewhat increased concentration of the compounds of this invention.

ii. Application for simultaneous resin treatment and fluorescent brightening in the same bath Methods for effecting resin finishing and fluorescent brightening of cellulosic fibers and like materials may fall into two categories: the first being the type which is most conventionally employed, wherein the resin treatment is carried out after fluorescent brightening; and the other wherein fluorescent brightening and resin treatment are simultaneously effected in the same bath. The former method has drawbacks in that it requires two steps and in that the brightness attained by the fluorescent brightening may deteriorate during the subsequent resin treatment. The latter method offers the advantage that both fluorescent brightening and resin treatment can be effected in a single step.

Known methods wherein fluorescent brightening and resin treatment are simultaneously applied to cellulosic fibers employ synthetic resin precondensates such as mono- or dimethylol urea resin or dimethylol alkylene urea resin and catalysts such as magnesium chloride or zinc sulfate in an acidic dipping bath.

When prior art fluorescent brighteners (for example the compound of formula (A) above) are added to the dipping bath, they often form precipitates in the bath due to the low pH and thus become incapable of imparting the desired fluorescent brightness to the material being treated. The formation of precipitates also often adversely affects the resin treatment itself. In contrast, the compounds of the present invention have excellent acid resistance and do not readily precipitate even at a pH of 3 or lower. They are also compatible with the aforementioned precondensates and catalysts.

In the resin treatment of cellulosic materials, the resin bath is either rendered strongly acidic or a catalyst of the zinc nitrate type is employed in order to improve the effect. When a zinc nitrate catalyst is used, the standard fluorescent brighteners produce a less than satisfactory brightness. The compounds of formula 1, in addition to their stability in acidic resintreating compositions, give good brightness when used in resin-treatment process employing a catalyst of the zinc nitrate type and the light resistance of the material treated is not reduced by their use.

The type of precondensates used in the resin treatment is not critical. Suitable precondensates, in addition to those already mentioned include, dimethylol urea resin, polymethylol melamine, dimethylol glyoxal monoureido resin, dimethylol triazone resin and derivatives thereof. These may be used either alone or as mixtures of two or more such compounds.

Catalysts with may be used in resin treatment employing the compounds of this invention in addition to those catalysts of zinc nitrate type mentioned above, include inorganic salts such as magnesium nitrate and ammonium sulfate and organic amine salts such as monoethanolamine hydrochloride and 2-amino-2-methylpropanol hydrochloride. These may also be used either alone or as mixtures of two or more such catalysts.

iii. Application to polyamide fibers

All of the compounds represented by formula 1 have excellent acid resistance. Consequently, little precipitation takes place, and the fluorescence and dyeability of these compounds is maintained at low pHs. Thus, the compounds of this invention will impart excellent brightness and good light resistance to polyamide fibers when applied thereto in an acidic bath at a temperature of 60° to 100°C, preferably 90° to 100°C.

The procedure for preparing the compounds of this invention and for using same will be described in more detail by means of the following examples. The examples are illustrative only and are not intended to limit the scope of the present invention as defined by the appended claims. In these examples, all the parts are by weight unless otherwise specified. In addition to the aforementioned prior art compound of formula A, the following prior art fluorescent brighteners were used in the examples for the purpose of comparison.

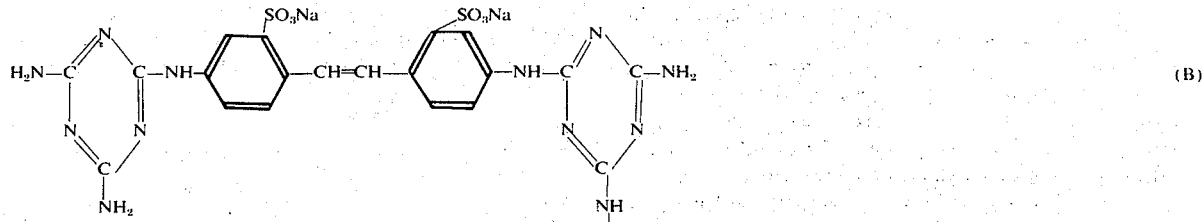
(B)

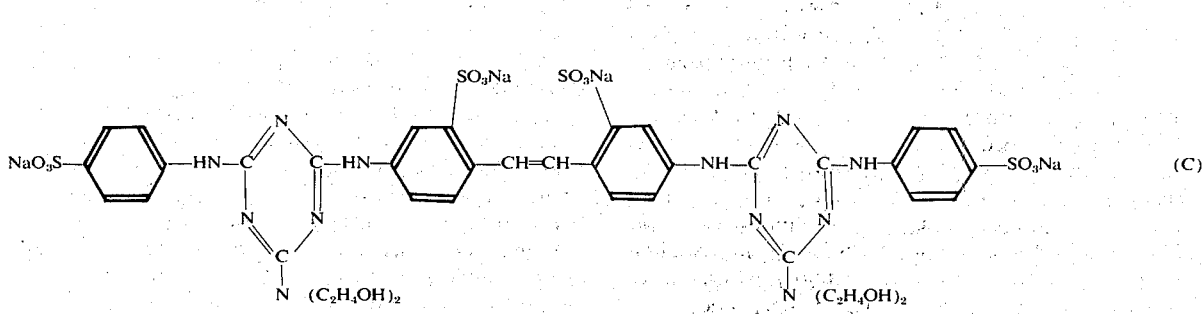
(C)

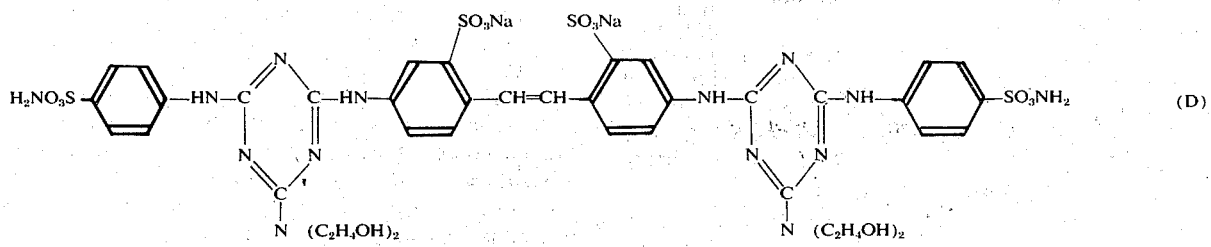
(D)

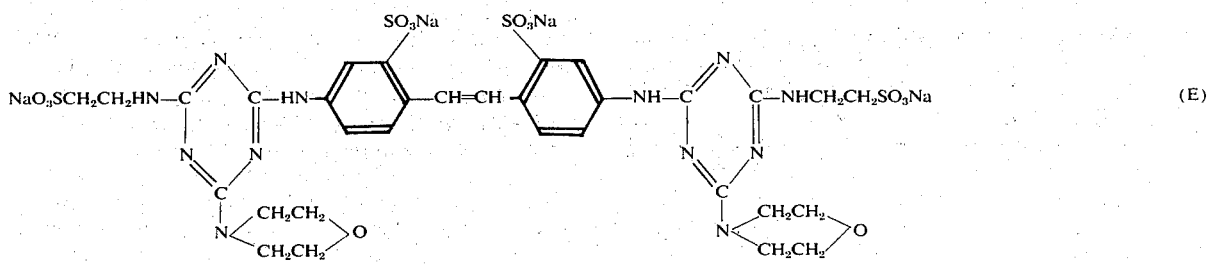
(E)

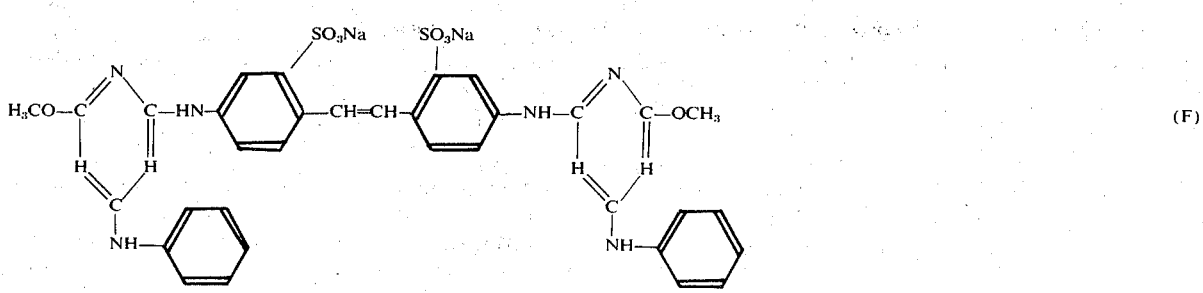
(F)

EXAMPLE 1

20 parts of cyanuric chloride was dissolved in 80 parts of acetone and the solution poured into a mixture of 90 parts of ice and 10 parts of water. To the resulting mixture was added dropwise over approximate one hour a solution of 26.6 parts of aniline-2,5-disulfonic acid and 4.4 parts of caustic soda in about 100 parts of warm water. During the addition, the reaction mixture was kept at 6° to 7°C and at pH 3 to 4 by controlled addition of about 16 percent aqueous caustic soda solution, and stirring continued for about 2 hours. The solution gradually turned to clear pale brown color. At the point where the test for the presence of the amine became negative, 19.5 parts of sodium 4,4'-diaminostilbene-2,2'-disulfonate dissolved in about 150 parts of warm water was added dropwise over approximate one and a half hour. During the addition, the temperature of the reaction mixture was allowed to rise gradually to 25° to 30°C, the pH thereof kept at pH 4 to 5 with controlled addition of 38 parts of 15 percent aqueous soda ash solution and stirring continued until the sodium 4,4'-diaminostilbene-2,2'-disulfonate was no longer detected. To the resulting reaction mixture were added in one portion 10.2 parts of phenol and 4.4 parts of caustic soda dissolved in such an amount of water as to make up to about 50 parts. The resulting solution was slowly heated up to 80°C, at which temperature stirring was continued for 4 hours. After the reaction was complete, activated carbon was added to the resulting reaction mixture and filtered to effect purification. The filtrate was salted out at about 70°C with 200 parts (20 percent based on the filtrate) of sodium chloride. The whole was filtered and the filter cake dried to give greenish yellow powder identified as sodium 4,4'-bis[2-(2,5-disulfoanilino)-4-phenoxy-1,3,5-triazinyl-6-amino]-stilbene-2,2'-disulfonate of formula

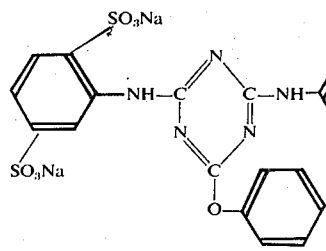
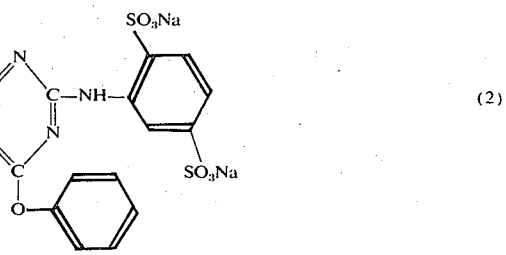
(2)

To a 3 % aqueous solution of a prepared oxidized starch (which may be oxidized starch or a coating agent for use in size press process) was added the compound of formula (2) to give 0.4 %, 0.6 % and 0.8 % aqueous solutions of said compound (the optical density of the compound was assimilated to that of the compound of formula (A) used as control) followed by stirring until homogeneous. The resulting coating compositions, after being raised to a temperature of 80°C, were each homogeneously applied to one side of a leaf of commercially available high quality paper (with no fluorescence) which was then dried on a drum drier to obtain the brightened paper. The brightness thus attained was estimated by comparison, made visually under sun light passed through a northern window, with that attained by the similar application of the prior art dye-stuff of formula (A). The results are set forth in the following table.

| Brightener | Concentration | | |
|---|---|---|---|
| | 0.4 % | 0.6 % | 0.8% |
| Compound of formula (A) | Standard | Standard | Standard |
| Compound of formula (2) | Considerably increased brightness | Considerably increased brightness | Outstandingly increased brightness |

As is evident from the data of the above table, high brightness was obtained with the respective concentration levels of the compound of formula (2), which effect was more prominent with higher concentration levels. This is believed to result from the superiority of the compound of formula (2) over the prior art compound (A) with respect to its "build up property", its afinity for the coating agent and for paper and with respect to its acid resistance.

EXAMPLE 2

The procedure as in Example 1 was repeated except that 14 parts of p-chlorophenol was used instead of the 10.2 parts of phenol used in Example 1, giving sodium 4,4'-bis[2-(2,5-disulfoanilin)-4-(p-chlorophenoxy)-1,3,5-triazinyl-6-amino] stilbene 2,2'-disulfonate having the following formula.

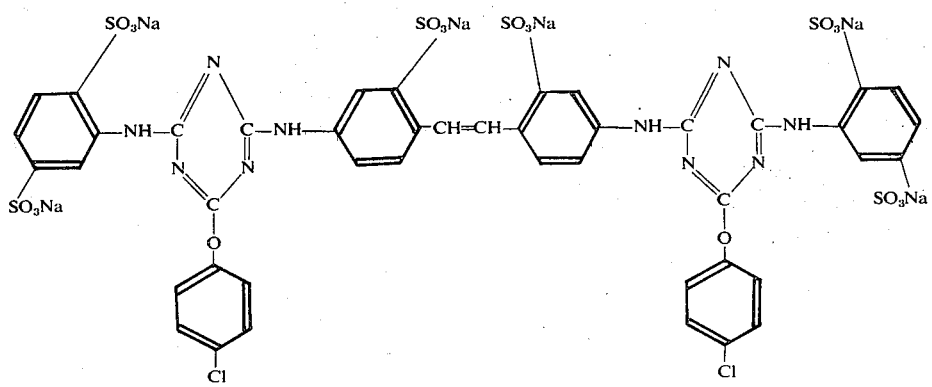
(3)

When a treatment by the size press process was made with the compound of formula (3) in the same manner as described in Example 1, results identical to those of Example 1 were obtained.

The procedure described above was repeated using o-chlorophenol, p-cresol, p-methoxyphenol, 2,4-xylenol, m-chlorophenol, p-ter.-butylphenol and p-octylphenol in place of the phenol, giving the compounds of formulas (4), (5), (6), (7), (8), (9) and (10) respectively. All of these compounds, when applied to paper in the same manner as in Example 1, gave results identical to those obtained in Example 1.

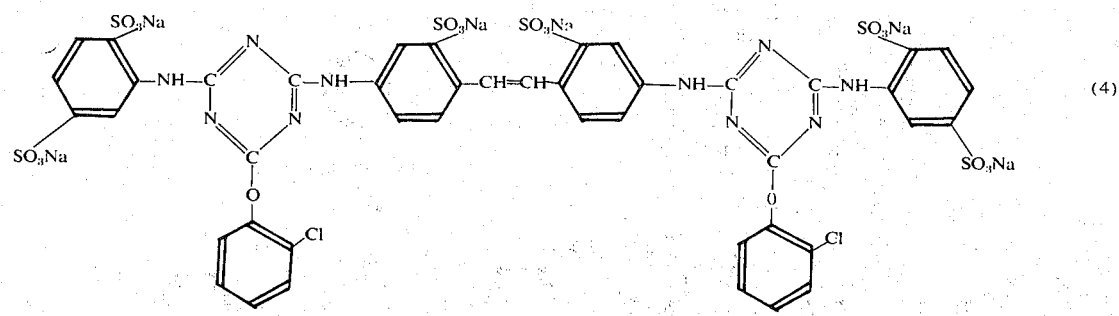

(4)

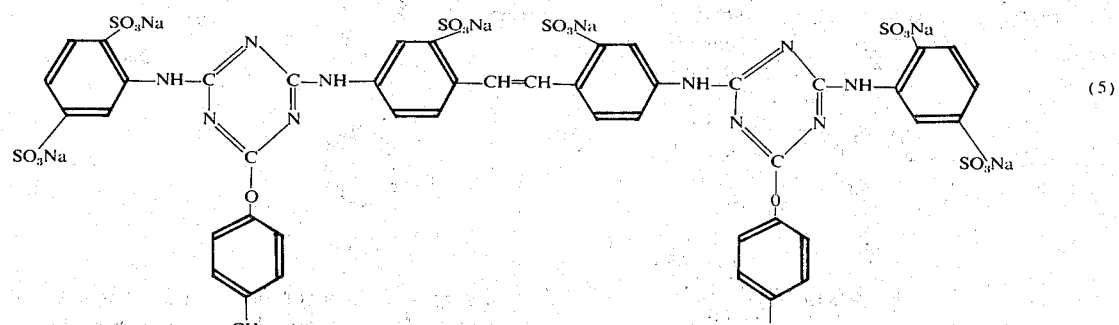

(5)

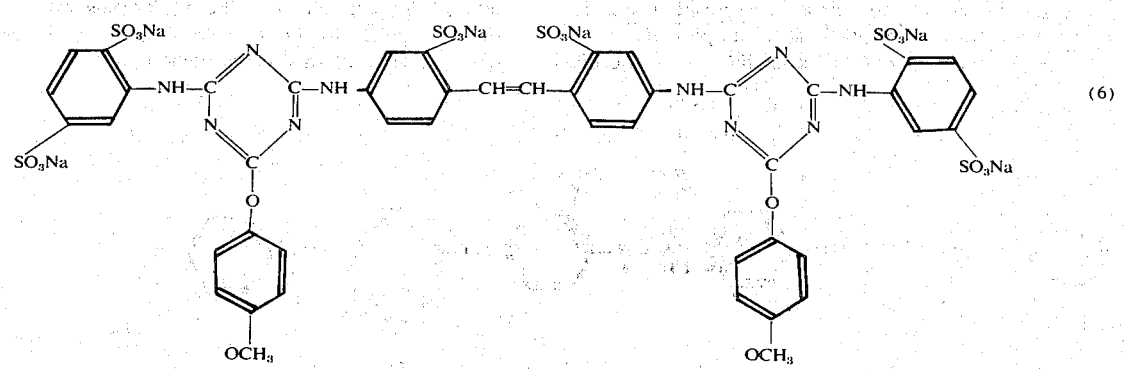

(6)

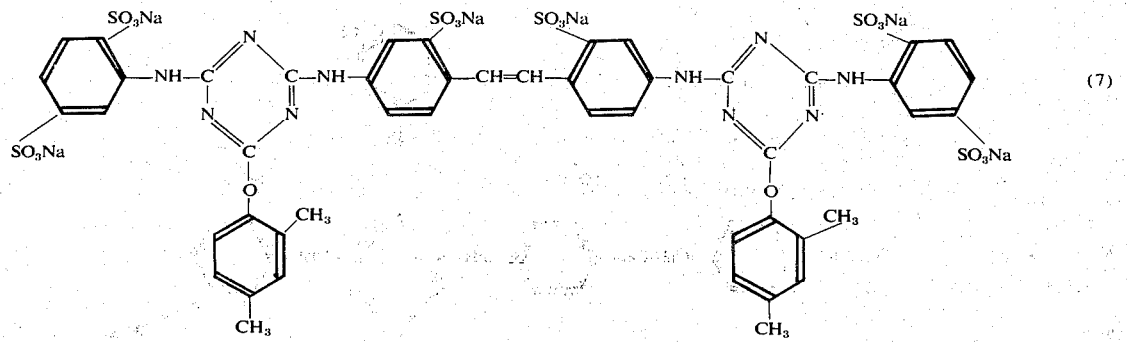

(7)

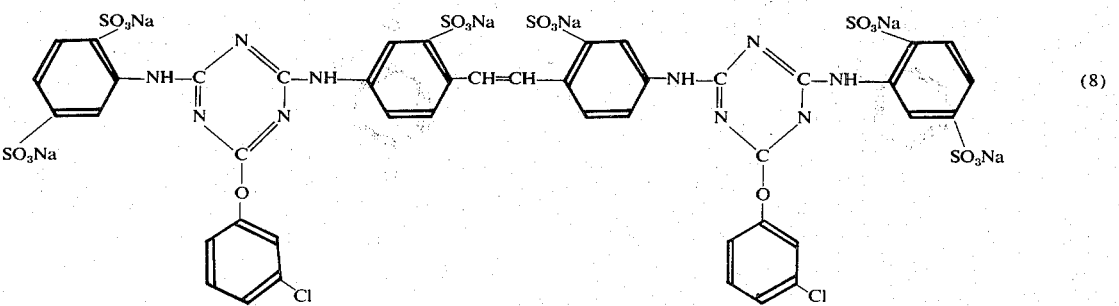

(8)

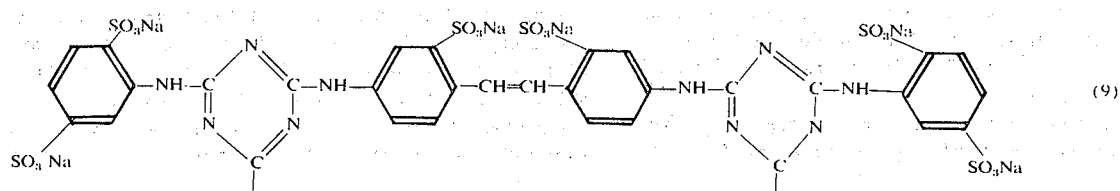

(9)

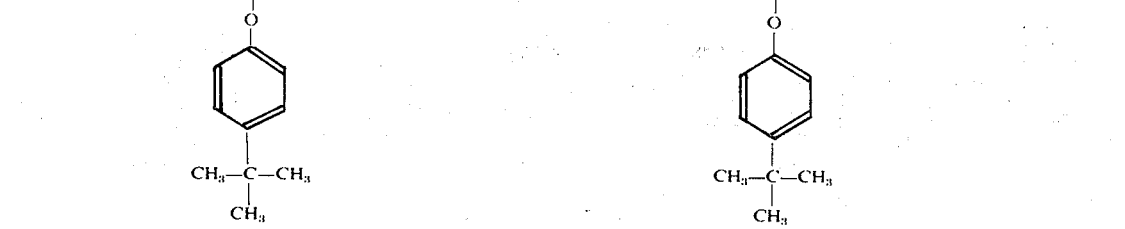

(10)

EXAMPLE 3

The procedure as described in Example 1 was followed with the exception that 2,4-dichlorophenol or 2-methyl-4-chlorophenol was used instead of the phenol and calcium chloride was used instead of the sodium chloride, giving the compounds of formulas (11) and (12), respectively. These compounds, when applied to paper in the same manner as in Example 1, again gave results as in Example 1.

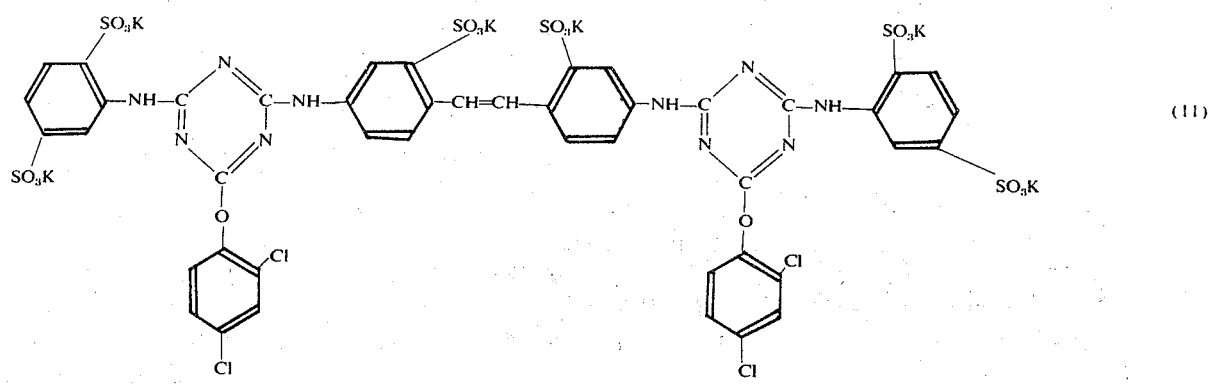

(11)

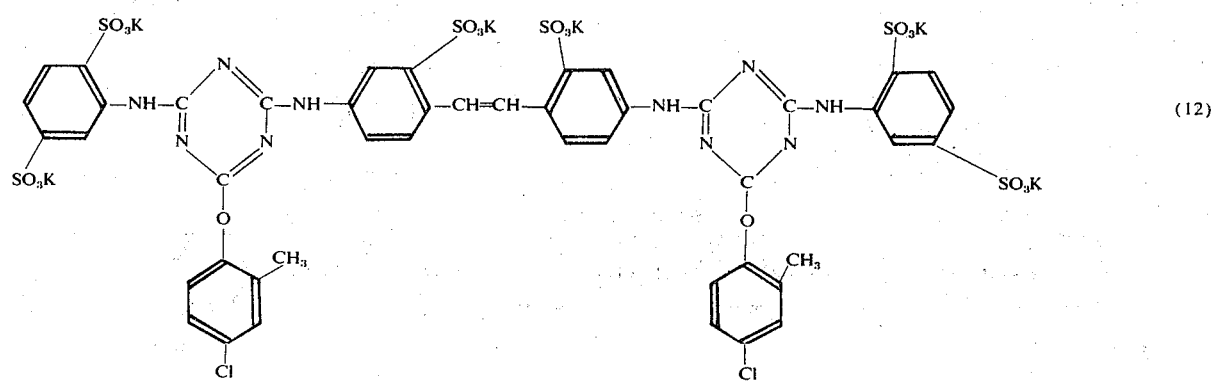

(12)

EXAMPLE 4

Method *a:* The brightness attained by application of a solution containing 3% oxidized starch, 1.5 percent commercially available sizing agent (HAMACOAT S manufactured by Hamano Kogyo) and 0.4 percent compound of formula 2 was visually estimated.

Method *b:* Brightness attained with a solution containing 3% oxidized starch and 0.4 percent compound of formula 2 was estimated. In both *a* and *b* the application conditions were the same as in Example 1 and the estimation of brightness was 1) made visually and 2) measured using a xenon standard white light source to determine the difference (indicated in table as Δ Z value) in Z values between the untreated and treated fabrics. For purposes of comparison, prior art compound B was also applied as in procedures *a* and *b* described above. The results are set forth in the following table

|  | Method b | | Method a | |
|---|---|---|---|---|
|  | Visual estimation | Δ Z value | Visual estimation | Δ Z value |
| Known compound of formula (B) | Standard | 9.5 | Sightly decreased brightness | 9.4 |
| Compound of formula (2) | Standard | 9.5 | Considerably increased brightness | 10.5 |

The foregoing shows that when used in combination with a surface sizing agent, the prior art dye-stuff produced slightly decreased brightness while the compound of formula 2 gave considerably increased brightness.

EXAMPLE 5

Example 4 was repeated substituting the compounds of formulas 3, 4, 5, 6, 7, 8, 9, 10, 11 and 12 for the compound of formula 2. The test results were substantially the same as those obtained with compound 2 in example 4.

EXAMPLE 6

The compound of formula (2) obtained in Example 2 and a prior art brightener (the compound of formula (C)) were each added to a coating composition consisting of

| Mineral pigment | |
|---|---|
| Clay | 90 parts |
| Titanium oxide | 10 parts |
| Casein | 10 % (based on mineral pigment) |
| Latex (styrene-butadiene copolymer) | 10 % (do.) |
| Dispersing agent (Sodium pyrophosphate) | 0.3 % (do.) | with water then added to give a solids content 40 percent, to give the stated concentrations of said compound and brightener (the optical density of the compound was assimilated to that of the brightener). The compositions thus obtained were stirred until homogeneous and then each was separately applied at normal temperature (20°C) to one side of a leaf of high quality paper (without fluorescence) at a coverage of 12 g/m$^2$ and immediately dried at 90°C. The resulting brightness was then estimated in the manner set forth in Example 1. The results are set forth in the following table.

| Brightener | Concentration of brightener (based on mineral pigment) | | | |
|---|---|---|---|---|
|  | 0.3 % | 0.8 % | 2.0 % | 4.0 % |
| Prior Art brightener (Compound of formula (C)) | Standard | Standard | Standard | Standard |
| Compound of formula (2) | Approximately the same | Slightly increased brightness | Considerably increased brightness | Outstandingly increased brightness |

As is evident from the foregoing data, in comparison to the prior art brightener, the compound of formula (2) produced, at lower concentration, approximately equal brightness, while at higher concentrations it produced increasingly higher brightness levels.

As far as the prior art brightener is concerned, brightness was highest at 2 percent concentration and a quenching phenomenon was apparently observed at 4.0 percent concentration.

Brightness obtained by treatment with compound (2) increased almost proportionally with increasing concentration and reached its maximum at about 6 percent concentration.

EXAMPLE 7

Treatment was repeated as in Example 6 using the compounds of formulas 3, 4, 5, 6, 7, 8, 9, 10, 11 and 12 in place of the compound of formula 2. The results for each compound were substantially identical to those obtained for 2 in example 6.

EXAMPLE 8

A 0.4 percent solution of the compound of formula (2) obtained in Example 1 (the optical density of the compound was assimilated to that of the known compound of formula (D)) and a 0.4 percent solution of the prior art compound of formula (D) were each added to a 3 percent solution of oxidized starch and the respective compositions thus obtained adjusted to three pH levels of 10, 8 and 6 with soda ash or acetic acid. Brightness attained after application of the compositions according to the manner described in Example 1 was estimated taking the pH 10 solutions as standard. The results are set forth in the following table.

| Brightener | pH | | |
|---|---|---|---|
| | 10 | 8 | 6 |
| Prior Art of formula (D) | Standard | Slightly deceased brightness | Considerably decreased brightness |
| Compound of formula (2) | Standard | Approximately the same brightness | Approximately the same brightness |

As is apparent from the foregoing data, with the prior art dye-stuff considerable changes in brightness were observed to occur with changes in pH but with the compound of formula 2, brightness remained unchanged independent of changes in pH and diminished very slightly with the passage of time.

EXAMPLE 9

The procedure of Example 8 was repeated with the exception that compounds of formulas (3), (4), (5), (6), (7), (8), (9), (10), (11) and (12) were used instead of the compound of formula (2). Again, the results obtained for each compound were substantially identical to those obtained for 2 in Example 8.

EXAMPLE 10

As previously noted, it is often desirable to use fluorescent brighteners in combination with an insolubilizing agent which may be zinc sulfate or an acidic resin. In this example two 10 percent zinc sulfate solutions were prepared, and the prior art compound of formula A was added to one solution and the compound of formula (2) was added to the other solution.

Addition of the prior art compound of formula A almost immediately formed insoluble precipitates. In contrast thereto, no precipitate formed upon addition of compound 2 and a brightened paper with a stable high brightness was obtained by application of the solution containing the compound of formula (2).

EXAMPLE 11

When the compounds of formulas (3), (4), (5), (6), (7), (8), (9), (10), (11) and (12) were added to zinc sulfate solutions in the manner of example 10, no precipitation occured. Stable brightened papers were obtained by application of each of these solutions.

EXAMPLE 12

The following resin-treating compositions each containing the compound of formula (2) were prepared according to the formulations (a), (b), and (c) shown below.

| | Method | | |
|---|---|---|---|
| | (a) | (b) | (c) |
| *Parmerfresh LKS (dimethylol hydroxyethylene urea, a glyoxal resin) | 12 parts | 12 parts | 12 parts |
| *Catalyst M (a magnesium chloride) | 5 parts | 5 parts | — |
| Phosphoric acid | — | added to pH 3.0 | — |
| *Catalyst F (a zinc nitrate) | — | — | 2 parts |
| Compound of formula (2) (The optical density thereof was assimilated to that of the known compound of formula (E)) | 0.2 part | 0.2 part | 0.2 part |
| Water | 82.8 parts | 80.8 parts | 85.8 parts |
| pH of resin bath | 6.6 | 3.0 | 6.0 |

(*All manufactured by Dai Nippon Ink & Chemicals, Inc.)

Into each of the above-described resin-treating compositions (a), (b) and (c) was dipped a scoured and bleached cotton broad cloth (No. 40) and the cloth wrung to a weight increase, based on the weight of the cloth itself, of 65 percent. The cloth was then pre-dried at 50° to 60°C for 10 minutes and subjected to curing at 150°C for 3 minutes. Thereafter, an aqueous solution containing 0.2 percent soda ash and 0.2 percent MONOGEN (Trade name; manufactured by Daiichi Kogyo Seiyaku Co., Ltd.) was applied to the cloth at 50° to 60°C for 5 minutes after which the cloth was water washed, dehydrated and dried.

Each of the broad cloths (a), (b) and (c) were of outstandingly brilliant whiteness. Brightness thus attained was estimated by visually comparing the same with that obtained by similar application of the prior art brightener of formula (E), in sun light passed through a northern window. The brightened cloths were also each tested for light resistance by irradiating the respective brightened cloths for 20 hours using a xenon lamp fade meter (manufactured by Toyo Rika Co., Ltd.) with the magnitude of fading estimated visually under sun light passed through a northern window. The results are set forth in the following table.

| | | Method | | |
|---|---|---|---|---|
| | | (a) | (b) | (c) |
| Brightening effect | Prior Art compound of formula (E) | Standard | Standard | Standard |
| | Compound of formula (2) | Better | Much better | Much better |
| Light resistance | Prior Art compound of formula (E) | Standard | Standard | Standard |
| | Compound of formula (2) | Approximately the same | Better | Better |

EXAMPLE 13

Example 12 was repeated substituting for the compound of formula (2), the compounds of formulas (3), (4), (5), (6), (7), (8), (9), (10), (11) and (12) respectively. The results for each compound for each of the formulations (a), (b) and (c) were approximately the same as those obtained with the compound of formula 2 in Example 12.

EXAMPLE 14

An aqueous solution containing 0.5 percent of the compound of formula (2) obtained as in Example 1 (the optical density of the compound was assimilated to that of the known compound (F)) and 2 percent glacial acetic acid, both concentrations being based on the weight of fibers, was prepared and adjusted to a bath ratio of 1:50. A scoured spun nylon waa placed in this bath, treated therein at 90°C for 30 minutes, water washed, dehydrated and dried. The thus treated spun nylon showed excellent whiteness and good light resistance. Estimation of brightness was made by visual comparison with the brightness obtained with the similarly applied prior art compound of formula (F), in sun light passed through a northern window. The test for light resistance was performed by irradiating the treated fabric for 20 hours using a xenon lamp fade meter (manufactured by Toyo Rika Co., Ltd.) with the magnitude of fading again estimated visually under sun light passed through a northern window. The results are set forth in the following table.

| | Prior Art Compound of formula (F) | Compound of formula (2) |
|---|---|---|
| Brightening effect | Standard | Equal to better |
| Light resistance | Standard | Better |

EXAMPLE 15

The procedure of Example 14 was repeated substituting compound (2) with the compounds of formulas (3), (4), (5), (6), (7), (8), (9), (10), (111) and (121), respectively. Spun nylon treated in the same manner as described in Example 14 with these solutions showed the same brightness and light resistance as that obtained with compound 2 in example 14.

The invention may be embodied in other specific forms without departing from its spirit or essential characteristics. The present embodiments are, therefore, to be considered in all respects as illustrative and not restrictive, the scope of the invention being indicated by the claims rather than by the foregoing description, and all changes which come within the meaning and range of the equivalents of the claims are therefore intended to be embraced therein.

We claim:

1. A bistriazinylaminostilbene derivative represented by the following formula:

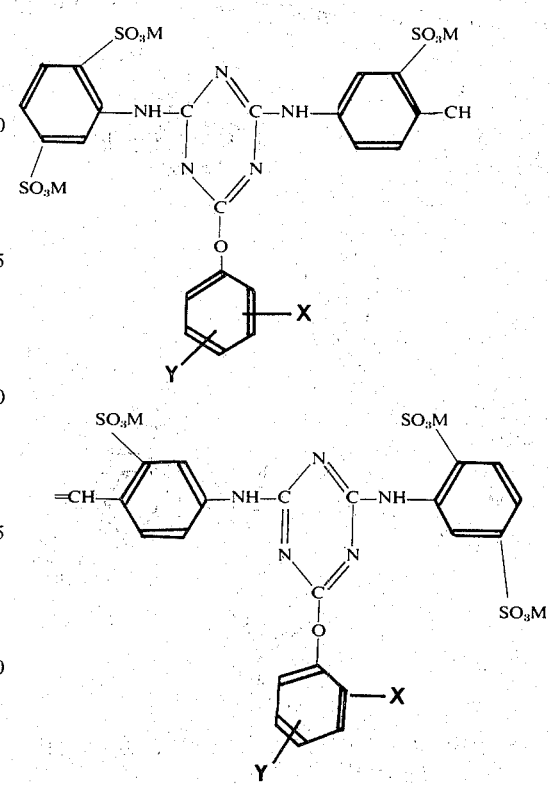

wherein X and Y are the same or different and selected from chlorine atoms, hydrogen atoms, alkyl groups or methoxy groups and M is selected from hydrogen atoms, alkali or alkaline earth metals or ammonium cations or ammonium cations derived from a primary, secondary or tertiary amine.

2. A compound represented by the following formula:

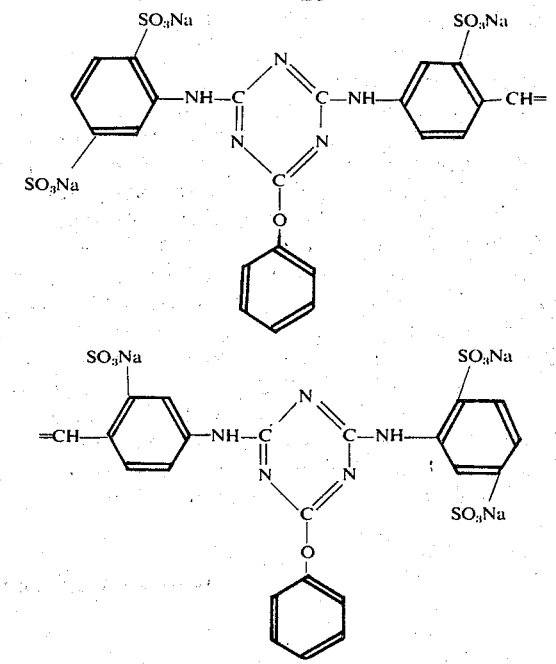
3. A compound represented by the following formula:
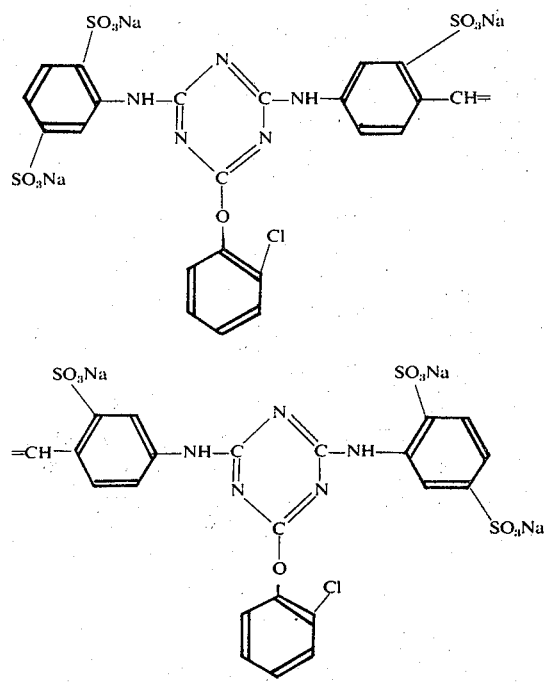
4. A compound reepresented by the following formula:
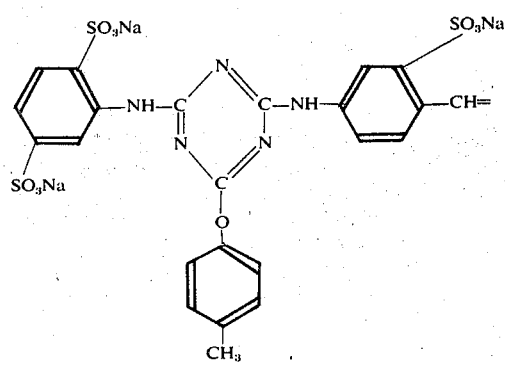
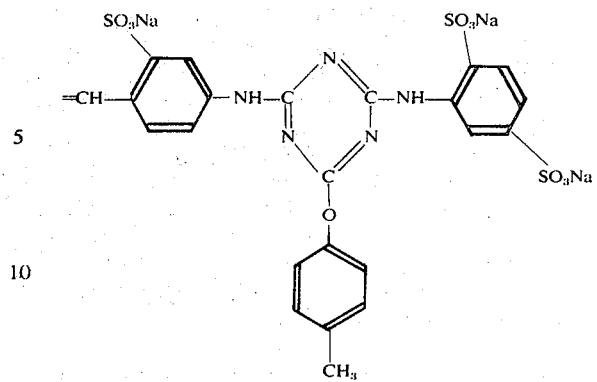
5. A compound represented by the following formula:
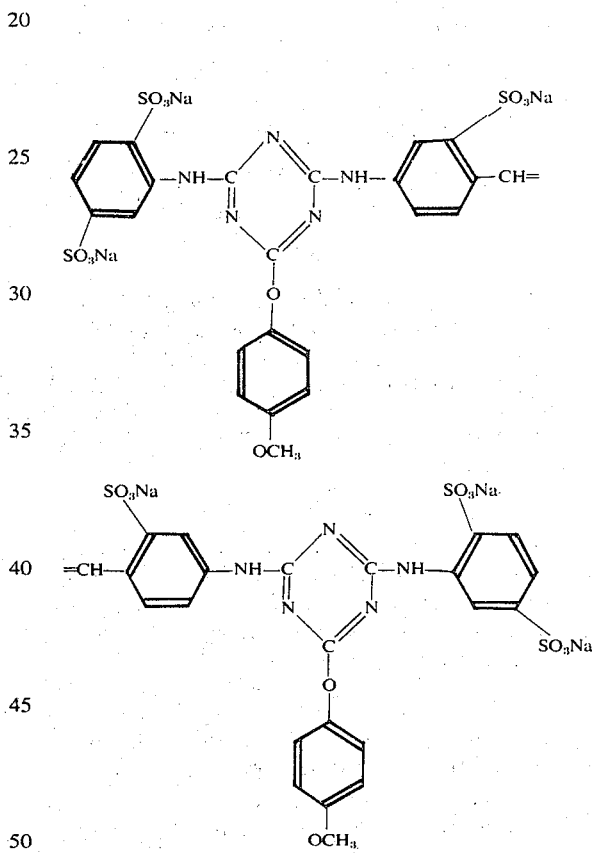
6. A compound represented by the following formula:
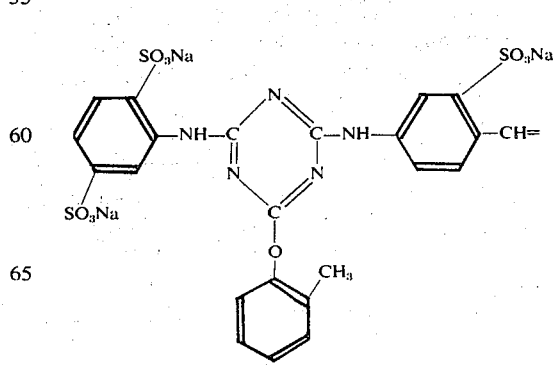

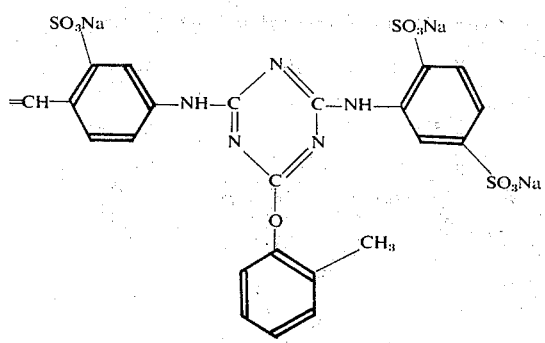
7. A compound represented by the following formula:
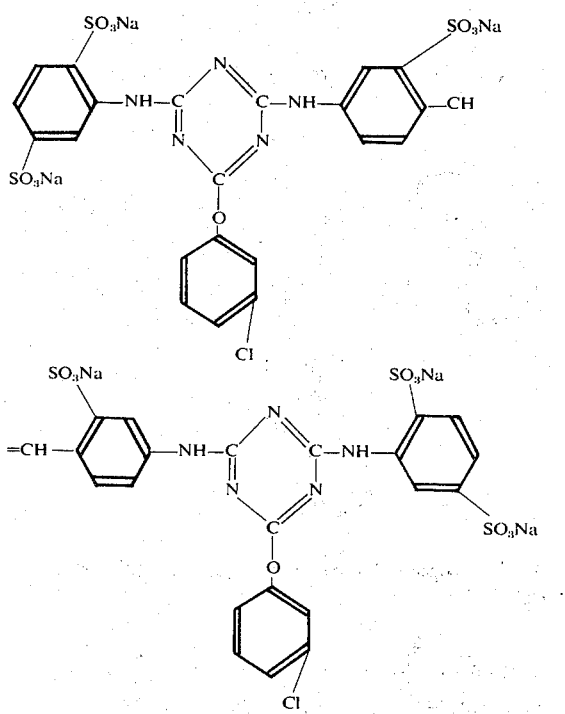
8. A compound represented by the following formula:
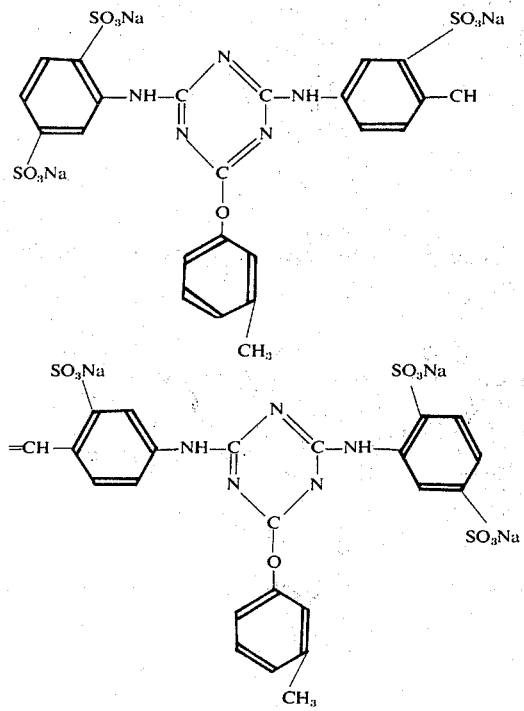
9. A compound represented by the following formula:
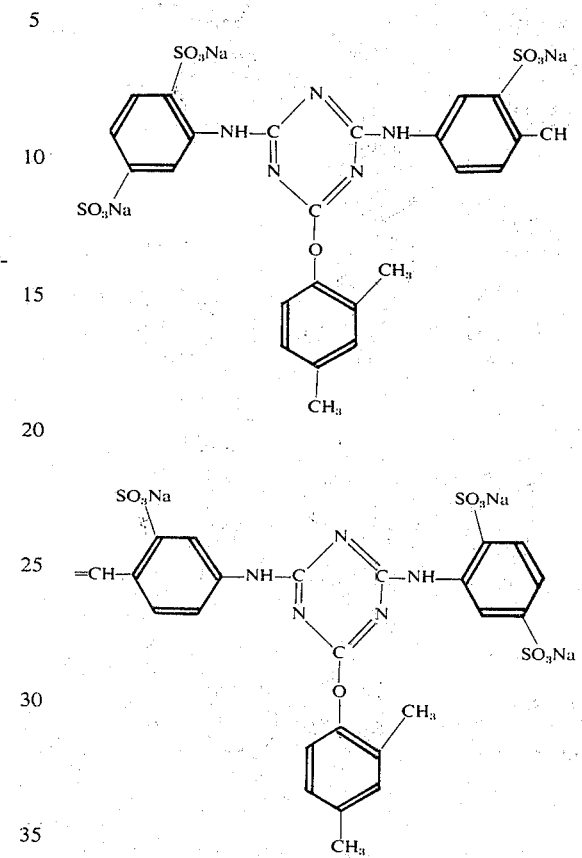
10. A compound represented by the following formula:
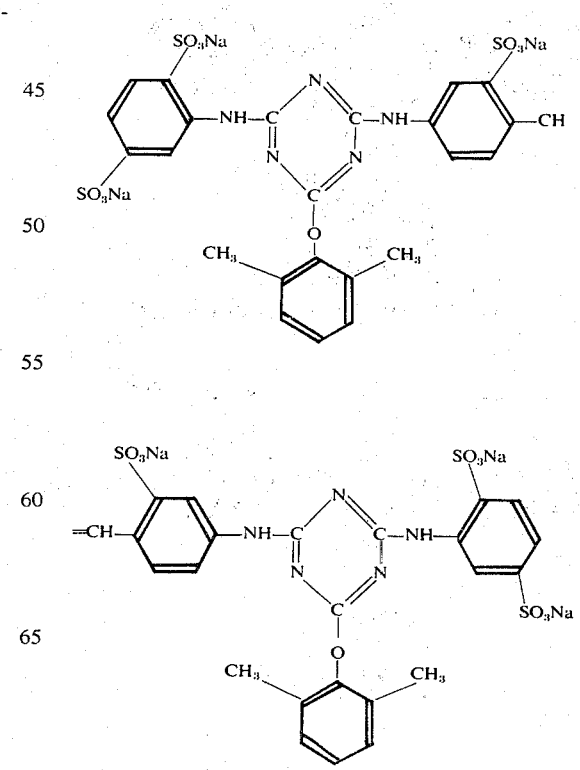

11. A compound represented by the following formula:
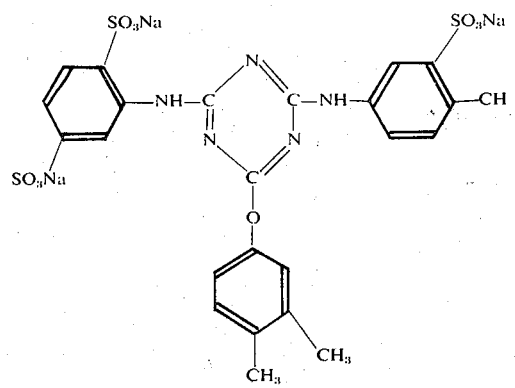
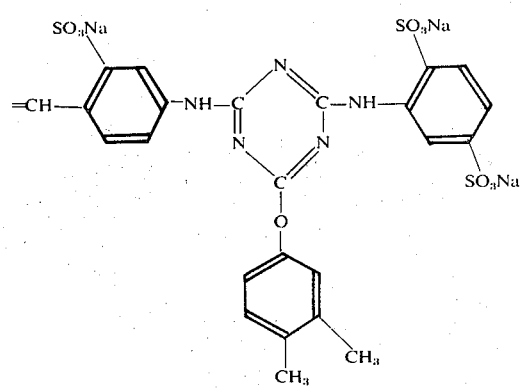
12. A compound represented by the following formula:
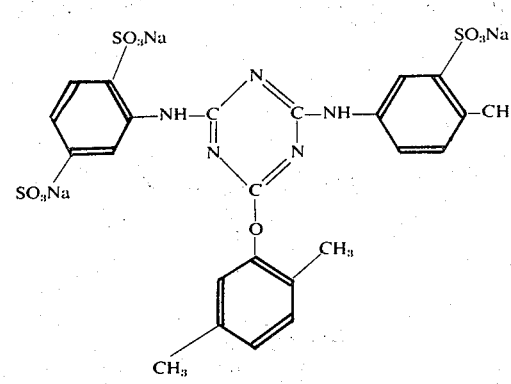
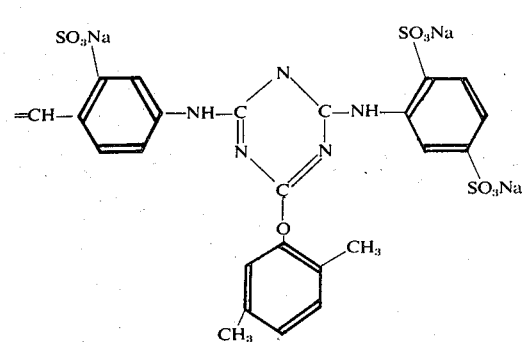
13. A compound represented by the following formula:
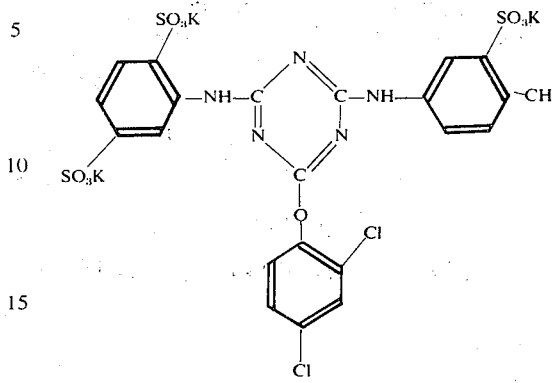
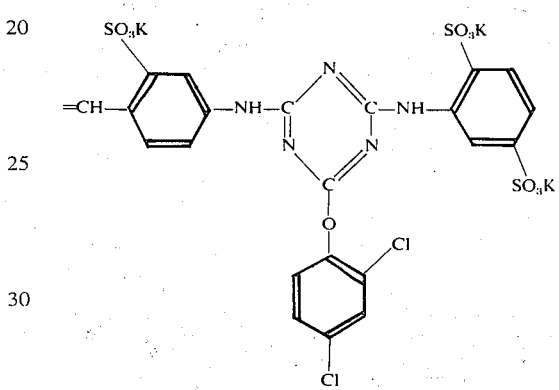
14. A compound represented by the following formula:
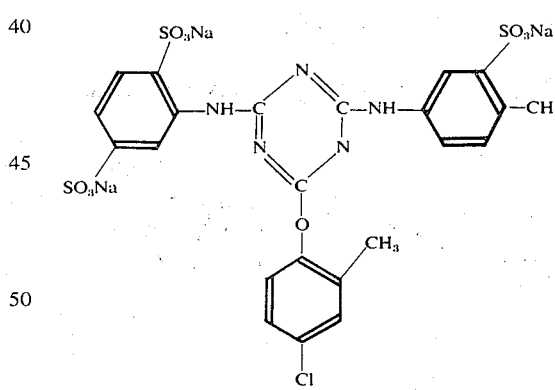
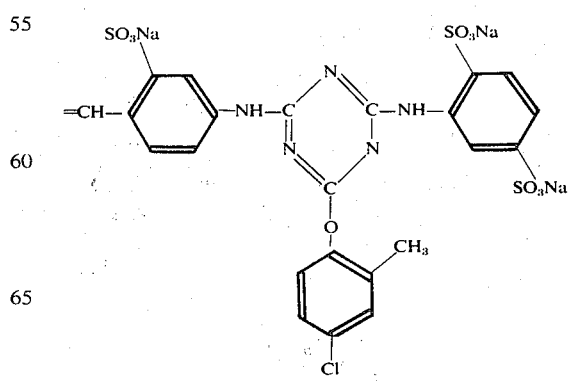

15. A compound represented by the following formula:
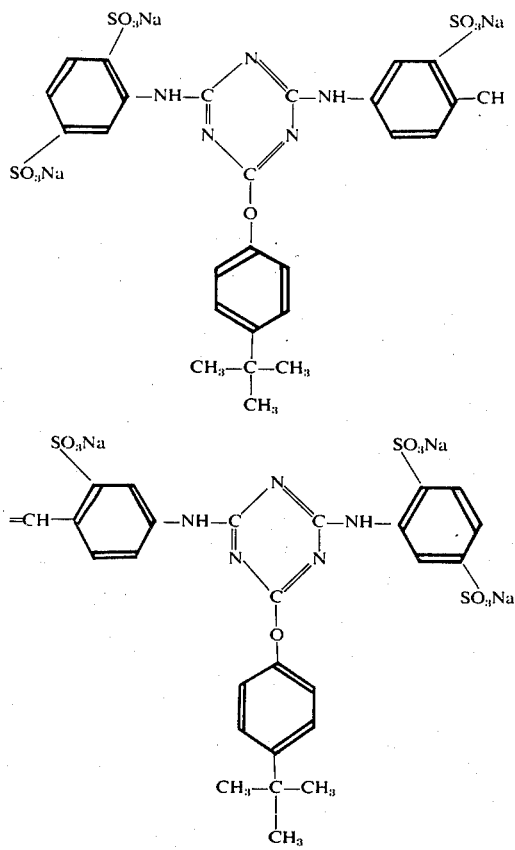
16. A compound represented by the following formula:
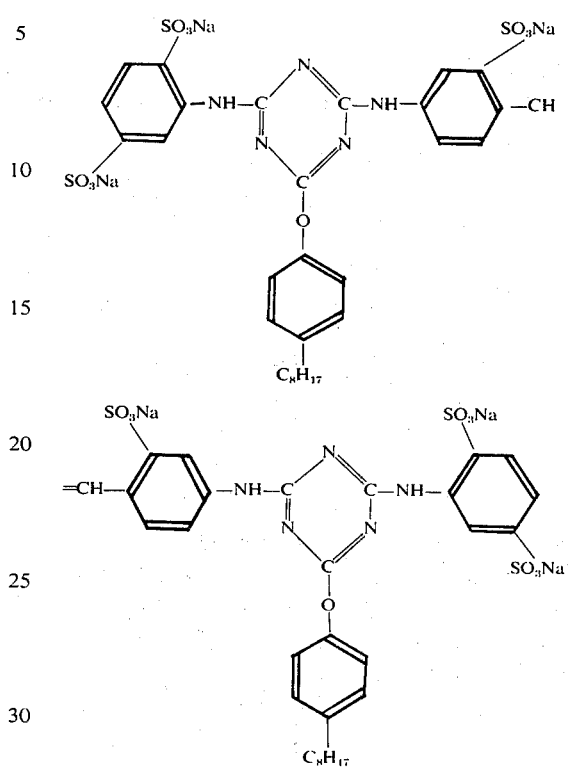
* * * * *